No. 622,484. Patented Apr. 4, 1899.
J. E. JACO.
PEA HARVESTER.
(Application filed Mar. 22, 1898.)
(No Model.) 2 Sheets—Sheet 1.
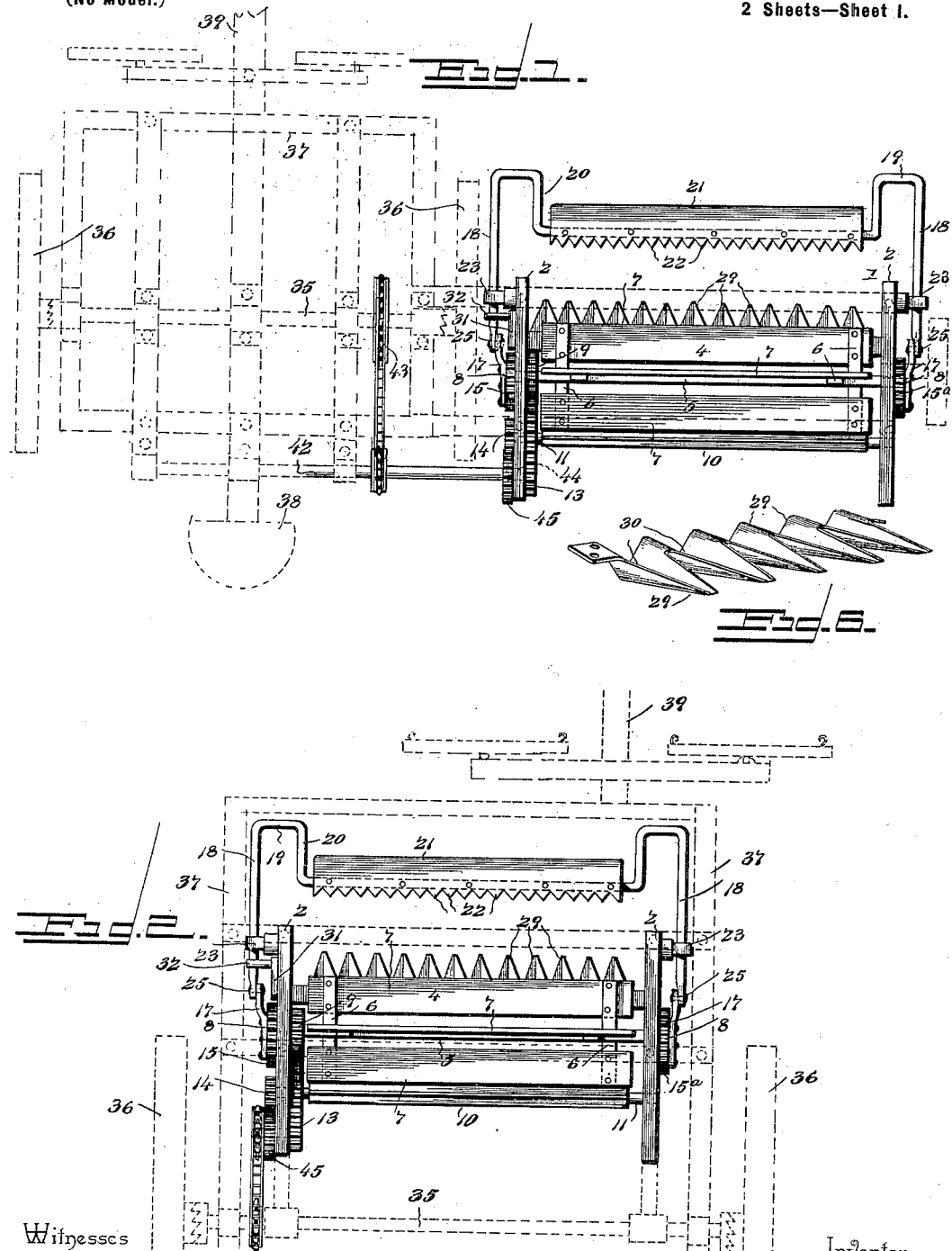

No. 622,484. Patented Apr. 4, 1899.
J. E. JACO.
PEA HARVESTER.
(Application filed Mar. 22, 1898.)
(No Model.) 2 Sheets—Sheet 2.
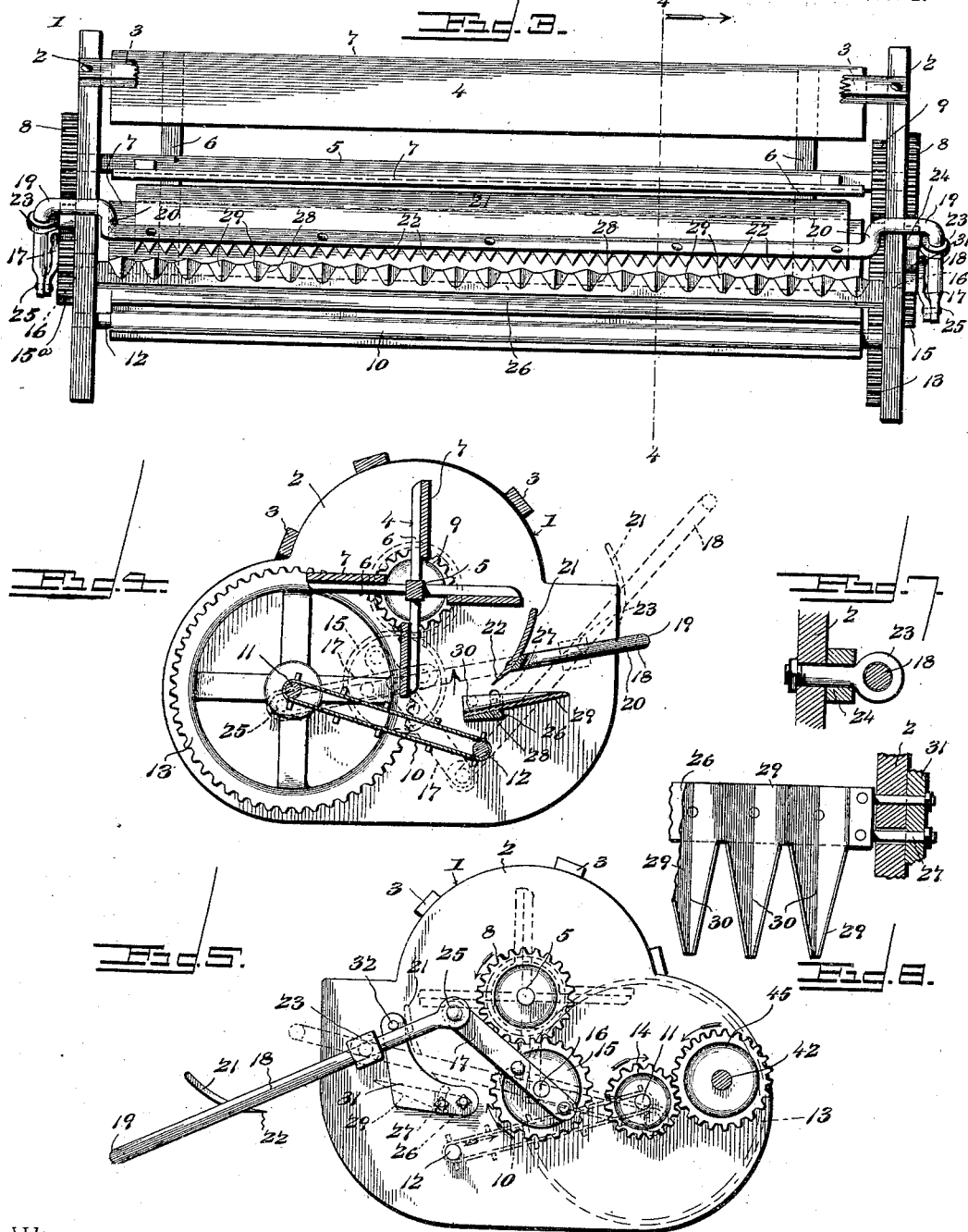

UNITED STATES PATENT OFFICE.

JOHN EVANS JACO, OF ROWLAND, TENNESSEE.

PEA-HARVESTER.

SPECIFICATION forming part of Letters Patent No. 622,484, dated April 4, 1899.

Application filed March 22, 1898. Serial No. 674,883. (No model.)

*To all whom it may concern:*

Be it known that I, JOHN EVANS JACO, a citizen of the United States, residing at Rowland, in the county of Warren and State of Tennessee, have invented a new and useful Pea-Harvester, of which the following is a specification.

This invention relates to improvements in pea-harvesters; and the object that I have in view is to provide means by which the peas will be gathered and delivered to suitable receptacles or sacks in a manner to reduce to a minimum the loss and waste of peas and to obviate breakage or shattering of the pea hulls or pods.

A further object of the invention is to provide means which are positively actuated to drag the peas into the conveying mechanism for delivery to a receptacle, and such gathering devices are peculiarly actuated to be raised clear of the pea-vines when moved to a position preliminary to dragging the vines and pods into the harvester.

With these ends in view the invention consists in the combination of a conveyer, a series of gathering-fingers channeled to receive the peas and inclined to deliver to the conveyer, a reciprocating gathering-bar actuated positively to be projected forward from the machine-frame and to be retracted, with the peas gathered thereby, in a rearward direction into the machine to deliver to the fingers and the conveyer, and a beater-reel over the conveyer and adjacent to the gathering-fingers.

The invention further consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a plan view illustrating the preferred arrangement of the harvesting mechanism at one side of the driving mechanism. Fig. 2 is a plan view illustrating one way in which the harvester may be combined with a driving mechanism. Fig. 3 is a front elevation of the harvester. Fig. 4 is a vertical cross-section through the harvester on the plane indicated by the dotted line 4 4 of Fig. 3, looking in the direction indicated by the arrow. Fig. 5 is an end elevation of the harvester, and Fig. 6 is a detail view of the gathering-fingers. Fig. 7 is a fragmentary detail illustrating one pivotal guide for the slidable arms of the gathering-bar. Fig. 8 is a fragmentary view, partly in plan and section, of the rocking finger-bar.

Like numerals of reference denote like and corresponding parts in each of the several figures of the drawings.

1 designates the frame of my improved pea-harvester, which may be of any suitable construction; but I prefer to employ a frame consisting of the end pieces 2 and the transverse rails 3, which are rigidly joined to the end pieces to present a substantial rigid structure. The frame may carry a suitable casing; but this is not essential, and the frame may have its end pieces 2 constructed to form runners, or the frame may be carried by suitable carrying-wheels. (Shown by dotted lines in Figs. 1 and 2.)

Within the frame is mounted a rotary reel 4, adapted to be positively driven and to act on the peas and vines which may be delivered thereto by the gathering mechanism, said beater-reel serving to separate the pods from the vines as they are carried through the machine preliminary to delivery to a receptacle or sack. The beater-reel consists of a shaft 5, the radial arms or spiders 6, and the blades 7, said spiders or arms being rigidly fastened to the shaft and the blades attached in like manner to the arms or spiders. The reel-shaft is journaled in suitable bearings in the end pieces of the frame, and said ends of the shaft are extended or prolonged through the frame to receive the gears 8. Near one end of the shaft and within one end piece of the frame is rigidly fastened a gear 9, which serves to drive or impel the endless elevator or conveyer 10. This endless elevator consists of a suitable web of fabric or other material, and it is arranged in an inclined position below the beater-reel. One end of the elevator is sustained by a driving-roller 11 and its other end by an idler-roller 12, both of said rollers being journaled in suitable bearings in the end pieces of the frame. The length of the endless elevator is coextensive with the length of the reel; but the width of the elevator is greater than the diameter of the reel, so that the forward receiving end of the elevator extends in advance of the reel. On one end of the driving-roller 11 for the elevator or conveyer is fastened a large driving-gear 13, which meshes directly with the gear 9 on the reel-shaft, thus operatively connecting the driving-roller for the conveyer with the reel for the said roller to drive the reel.

On the outside of one of the end pieces of the frame is arranged a driving-gear 14, which is secured to an end of the driving-roller 11, and this roller 11 is provided within the frame-piece with a large gear 13, which meshes with a gear 9 on the reel-shaft, and outside of the frame-piece the reel-shaft has gears 8, which mesh with the master-gears 15 15$^a$. The master-gears 15 and 15$^a$ are arranged on the outside of the end pieces 2 of the frame, and they are carried by stub-axles 16, suitably attached to said end pieces 2. The master-gear 15 at one end of the frame meshes with one gear 8 on the reel-shaft, thus forming a train of gears from the roller 11 to the reel and from the reel to the master-gears, which are driven by the endless conveyer, and the other master-gear 15$^a$ at the opposite end of the frame meshes with the other gear 8 on the positively-driven reel-shaft, so that the reel-shaft serves to rotate both of the master-gears 15 15$^a$.

To the master-gears 15 and 15$^a$ are rigidly fastened the arms 17, a pair of which are employed and which are rigidly fastened to the master-gears in any suitable way. The master-gears are arranged to rotate in unison, and the arms 17 occupy corresponding positions with relation to said master-gears for the purpose of properly actuating the carrier-bars 18. These carrier-bars are arranged at opposite ends of the machine-frame, and at one end each bar is bent to form the loop 19 and the short finger 20, said loops being provided in the carrier-bars to enable the latter when retracted to extend inwardly between the end pieces of the frame. The fingers 20 of the carrier-bars extend inwardly toward each other, and to said fingers is secured the gathering-bar 21, which consists of a straight length of metal provided on its inner edge next to the machine with a series of teeth 22. These teeth may constitute an integral part of the bar or they may be made separate from the bar and rigidly fastened thereto. The teeth are preferably sharpened to produce cutting edges thereon adapted to sever the vines and pods as the gathering-bar is positively drawn in a rearward direction, and this gathering-bar occupies a horizontal position in advance of the machine-frame. The carrier-bars 18 are slidably fitted in the guides 23, which are shown in the form of loops or clasps loosely embracing the bars 18 to permit the latter to slide or reciprocate freely in said guides, which are loosely or pivotally mounted, as at 24, on the ends 2 of the frame, so that the guides shift their positions and accommodate themselves to the angle of the gathering-bars when actuated from the master-gears. The guides 25 are supported, preferably, by bolts, which constitute the pivotal connections with the frame, and the carrier-bars 18 are pivotally attached at their inner ends, as at 25, to the arms 17 on the master-gears.

26 designates a finger-bar which is arranged in a horizontal position within the frame and above the receiving end of the inclined endless conveyer. This finger-bar is provided at its ends with pintles or journals 27, loosely mounted in the end pieces of the frame, and in the upper face of said finger-bars is a series of deep transverse seats 28, preferably of concave form and spaced at suitable intervals from each other. These seats receive a plurality of fingers 29, each of which is channeled in the direction of its length, as at 30. The channels extend from end to end of the fingers, which are tapered longitudinally, so that the channels widen from the front ends of the fingers to the rear delivery ends thereof. The channels are quite deep, and they are arranged close together in the same horizontal plane to afford a large surface, on which the peas and vines may be deposited from the gathering-bar. The finger-bar occupies a horizontal position in a plane below the path of the gathering-bar, and said finger-bar is supported or the fingers are attached thereto in a manner to cause the fingers to assume a downwardly and rearwardly inclined position over the front end of the endless conveyer, whereby the fingers are adapted to deliver directly to said conveyer. The fingers may be made individually in the tapered and channeled form from either cast or sheet metal, or the fingers may be made in series in a single piece of metal, as represented by Fig. 6 of the drawings. The finger-bar is situated above the conveyer at a short distance in rear of the front edge thereof and its idler-roller 12, and said finger-bar is thus adapted to catch and retain the vines or pods which may have a tendency to escape from the conveyer. The finger-bar may be sustained in a stationary position within the machine-frame; but I prefer to pivotally mount said finger-bar so that it will have a rocking or agitating movement. This is effected by the employment of a tappet 31, which is rigidly fastened to a protruding journal or tenon of the finger-bar, and this tappet is arranged on the outside of one end piece of the frame for its finger 32 to ride upon or engage with one of the slidable carrier-bars 18, whereby as the bar 18 is actuated by the master-gear and the guide 23 thereof oscillated the finger 32 will be operated to rock the tappet 31, which in like manner actuates the finger-bar to cause the vines or pods on the fingers to gravitate toward and upon the endless conveyer.

My improved harvester may be combined with the driving mechanism in either of the two ways represented in Figs. 1 and 2. In Fig.

1 the harvester is outside of the driving mechanism to occupy a lateral relation thereto, and this driving mechanism consists of a suitable frame 37, provided with bearings for the reception of an axle 35, on which are mounted the traction-wheels 36. A suitable clutch mechanism is arranged between the axle and the traction-wheels, so that the motion of the wheels is communicated to the axle to rotate the latter, and said axle is operatively connected with a counter-shaft 42 by means of the gearing 43. The counter-shaft extends beyond one end of the frame of the machine, and to the protruding end of the counter-shaft is secured a gear 45, which meshes with the driving-gear 14 on the harvester, said extended end of the counter-shaft being provided with a bearing 44 in one end piece of the harvester-frame. The harvester may be operatively connected with the frame of the driving mechanism by suitable braces or other devices, and to said frame of the driving mechanism are connected the draft-tongue 39 and the driver's seat 38, all of the usual or any preferred construction.

The harvester may be arranged within the limits of the frame of the driving mechanism, as represented by Fig. 2, and in this adaptation of the invention the driving-gear 14 of the harvester mechanism is directly connected with the axle of the driving mechanism either by sprocket-and-chain gearing or by gear-pinions, at the option of the skilled mechanic.

The operation may be described as follows: The driving-gear 14 is positively driven from the described connections with the driving mechanism, and the roller 11 is thus driven to impel the endless apron or conveyer and also rotate the reel, which in turn rotates the master-gears 15 $15^a$ to actuate the gathering mechanism, whereby all the parts are positively driven by the gearing connecting the harvester with the driving mechanism. The arms 17, rigidly attached to the pair of master-gears, which are driven positively in unison, serve to reciprocate the carrier-bars which support the transverse gathering-bar 21, and as these arms 17 rotate with the master-gears they assume different positions with respect to the pivoted supporting-guides 23, whereby the gathering-bar is reciprocated toward and from the finger-bar and the endless conveyer. With the master-gears in position to project the arms 17 downwardly from the centers of said gears the carrier-bars assume the vertically-inclined position shown by Fig. 5, and on the continued rotation of the master-gears in the direction indicated by the arrow the arms 17 impel the carrier-bars and the gathering-bar in an outward and upward direction, thereby forcing the gathering-bar away from the harvester in advance thereof and over the growing vines. The continued rotation of the master-gears projects the carrier and gathering bars away from the harvester until the arms 17 pass beyond a line drawn through the axes of the master-gears and the pivoted supporting-guides 23, at which time the arms compel the carrier-bars and the gathering-bar to drop downwardly, and thus cause the gathering-bar to present its toothed surface to the vines. As the master-gears continue to rotate and the arms 17 pass in a rearward direction the bars 17 are drawn inward to cause the gathering-bar to drag the peas and vines into the harvester over the toothed finger-bar and upon the endless carrier. During the rocking and reciprocating motion of the carrier and finger bars the guides 23 oscillate on their pivotal connections with the harvester-frame. The gathering-bar is supported by the guides to travel over the finger-bar and to deliver the gathered peas and vines upon the endless conveyer, the inward travel of the gathering-bar terminating close to the path or sweep of the beater-reel, and thus the gathering-bar drags the vines and pods into a position for the rotary arm to beat the pods from the vines and deposit the same upon the conveyer. The gathering-bar is drawn inwardly into the harvester-frame over the lower front end of the endless conveyer, and as the finger-bar is above the conveyer and the fingers thereon project in advance of the lower front end of the conveyer said fingers are arranged to receive any peas which may have a tendency to escape from the gathering-bar, thus promoting the efficiency of the machine and reducing the liability of the peas to escape during the operation of emptying the load from the gathering-bar upon the conveyer. The reel is positively driven to sweep close to the gathering and finger bars, and the conveyer carries the peas in an upward direction rearwardly through the machine to deposit the same in a suitable receptacle or sack. During the reciprocation and oscillation of the gathering-bar the finger-bar is rocked or oscillated by the finger 32 of the tappet 31, riding upon the edge of one of the carrier-bars 18, and as the fingers are inclined rearwardly toward the endless conveyer the contents of the fingers are delivered to said conveyer without waste of the peas or vines.

I am aware that changes in the form and proportion of parts and in the details of construction may be made by a skilled mechanic without departing from the spirit or sacrificing the advantages of the invention, and I therefore reserve the right to make such modifications as clearly fall within the scope of the invention.

Having thus described the invention, what I claim is—

1. In a pea-harvester, the combination with a conveyer, of a reciprocating gathering-bar situate in advance of the conveyer and adapted to travel toward and from the same, and mechanism for sweeping the load on the gathering-bar to the conveyer, substantially as described.

2. In a pea-harvester, the combination with a conveyer, of a gathering-bar, means for imparting oscillating and reciprocating motion to said gathering-bar and causing it to travel toward and from the conveyer and in advance of the latter, and a reel situated over the conveyer and close to the limit of the inward travel of the gathering-bar, substantially as described.

3. In a harvester, the combination with a conveyer, and a reel arranged to sweep over the conveyer, of a reciprocating gathering-bar adapted to travel toward and from the conveyer, and means for operating and supporting the gathering-bar comprising the carrier-bars to which the gathering-bar is attached, movable guides in which the carrier-bars are slidably fitted, and driving devices to reciprocate the carrier-bars, substantially as described.

4. In a pea-harvester, the combination with a conveyer, and a reel, of the gathering-bar arranged to reciprocate in advance of the conveyer and reel, rocking guides in which the carrying-arms of the gathering-bar are slidably fitted, and master-gears having link connections with the gathering-bar, whereby said gathering-bar is mounted and operated to travel in vertical and horizontal paths in advance of the conveyer, substantially as described.

5. In a pea-harvester, the combination with a conveyer, of a rocking bar situated above said conveyer adjacent to its receiving end and having the delivery-fingers, a gathering-bar mounted to travel over the fingers and the rocking bar, and a reel, substantially as described.

6. In a pea-harvester, the combination with a conveyer, of a rocking bar provided with inclined fingers and mounted contiguous to the receiving end of said conveyer, a gathering-bar reciprocating in advance of the finger-bar and sweeping over the fingers, and means for rocking said finger-bar and the fingers in unison with the reciprocating travel of the gathering-bar, substantially as described.

7. In a pea-harvester, the combination with a conveyer, and a reel, of a finger-bar lying in a plane between the reel and the receiving end of said conveyer and having channeled fingers inclined toward said conveyer, and a gathering mechanism arranged to travel over the finger-bar toward the path of the reel, substantially as described.

8. In a pea-harvester, the combination with a conveyer and a reel, of a finger-bar situated below the reel and above the front end of the conveyer, and a gathering mechanism which reciprocates toward and from the reel and is arranged to sweep over the finger-bar, substantially as described.

9. In a pea-harvester, the combination with a conveyer, a reel and a gathering mechanism, of a rocking finger-bar supported above the conveyer and below the path of the gathering mechanism, and means for positively actuating the finger-bar, substantially as described.

10. In a pea-harvester, a rocking finger-bar and a series of channeled fingers supported thereby to incline rearwardly, combined with a conveyer arranged with its receiving end below the series of inclined fingers, and a gathering mechanism traveling over the fingers to deliver to the latter, substantially as described.

11. In a pea-harvester, the combination of an endless conveyer, a reel situated thereover, a reciprocating gathering mechanism traveling in advance of the conveyer and limited in its inward travel adjacent to the path of the reel, and a delivery mechanism between the conveyer and the gathering mechanism to receive from the latter and deliver to the conveyer, substantially as described.

12. In a pea-harvester, the combination with a suitable driving mechanism, of a reel, a pair of master-gears driven from the power mechanism and rotating in unison with the reel, a conveyer geared to the reel, a reciprocating gathering mechanism actuated by the master-gears, and a finger-bar situated in advance of the reel over the conveyer and below the path of the gathering mechanism, substantially as described.

13. In a pea-harvester, the combination with a conveyer, and a reciprocating gathering mechanism, of a series of tiltable inclined fingers between the conveyer and the path of the gathering mechanism, and tappet devices connected with said fingers and actuated by the travel of the gathering mechanism to rock the fingers as the gathering mechanism moves away from the fingers, substantially as described.

14. In a pea-harvester, the combination with a conveyer, of the finger-bar having a series of fingers and pivotally supported contiguous to the receiving end of said conveyer, oscillating guides, carrier-bars supporting a gathering-bar and slidably fitted in said guides, means for reciprocating the carrier-bars and the gathering-bar thereon, and tappet devices connected to the finger-bar and actuated by the carrier-bars, substantially as described.

In testimony that I claim the foregoing as my own I have hereto affixed my signature in the presence of two witnesses.

JOHN EVANS JACO.

Witnesses:
HUGH SPARKMAN,
J. R. GARDNER.